2 Sheets—Sheet 1.

W. J. SMITH.
GRATES FOR FURNACES.

No. 178,030. Patented May 30, 1876.

WITNESSES.
James I. Kay
James K. Bakewell

INVENTOR.
William J. Smith
by Bakewell & Kerr
Attys

N. PETERS, PHOTO-LITHOGRAPHER, WASHINGTON, D. C.

2 Sheets—Sheet 2.

W. J. SMITH.
GRATES FOR FURNACES.

No. 178,030. Patented May 30, 1876.

WITNESSES
James D. Kay
James K. Bakewell

INVENTOR
William J. Smith
by Bakewell & Kerr
Attys

UNITED STATES PATENT OFFICE.

WILLIAM J. SMITH, OF PITTSBURG, PENNSYLVANIA.

IMPROVEMENT IN GRATES FOR FURNACES.

Specification forming part of Letters Patent No. 178,030, dated May 30, 1876; application filed March 31, 1875.

*To all whom it may concern:*

Be it known that I, WILLIAM J. SMITH, of the city of Pittsburg, in the county of Allegheny and State of Pennsylvania, have invented a new and useful Improvement in Grates; and I do hereby declare the following to be a full, clear, and exact description thereof, reference being had to the accompanying drawing, forming part of this specification, in which—

Figure 1:
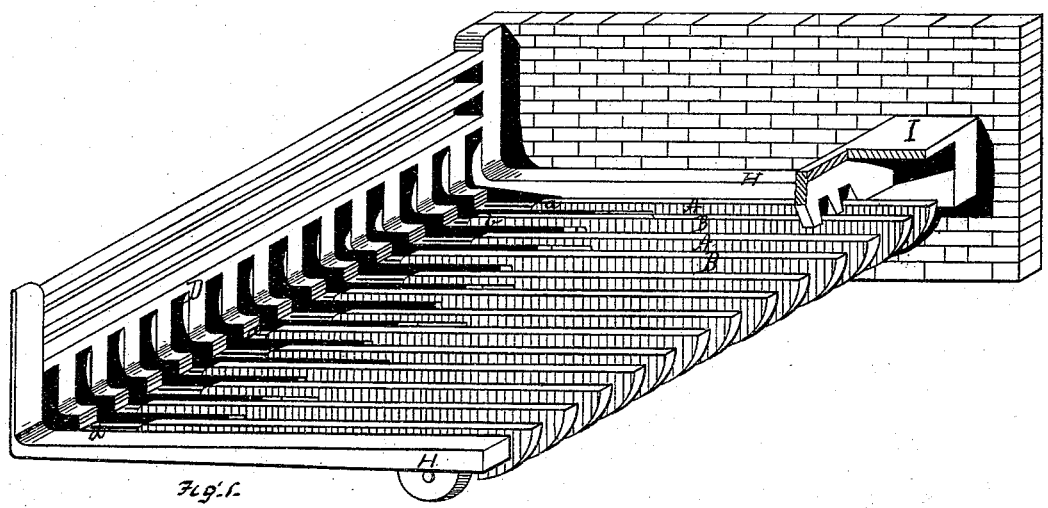
Figure 2:
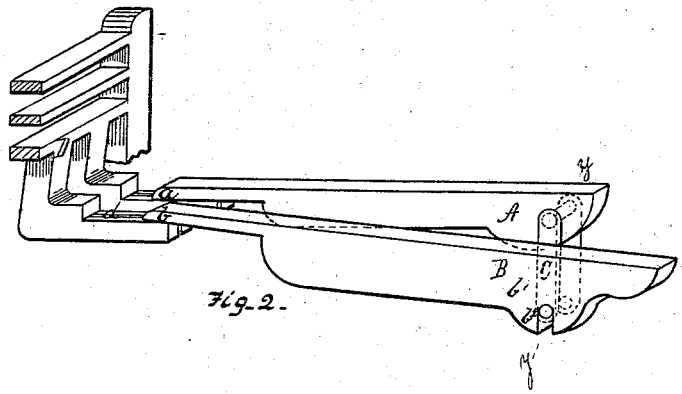
Figure 4:
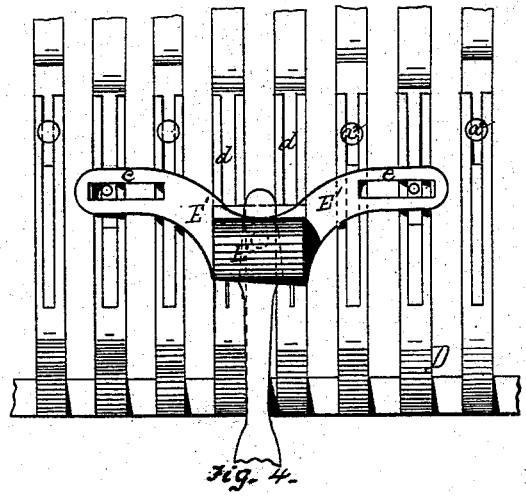
Figure 3:
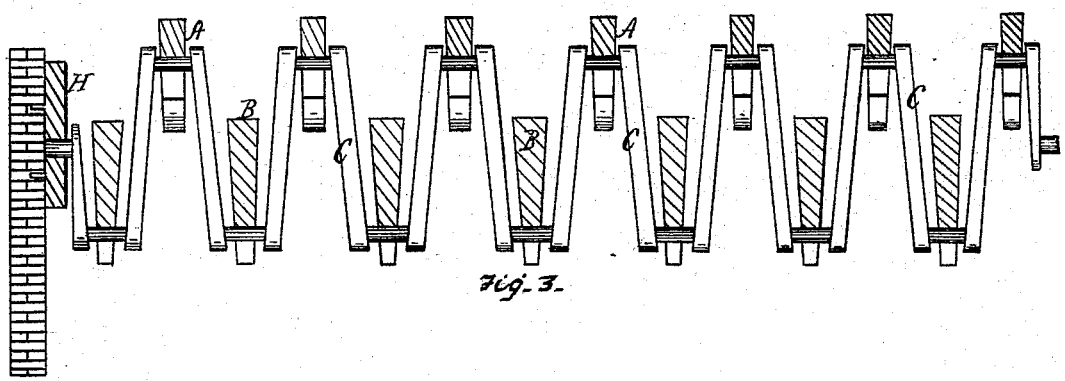
Figure 5:
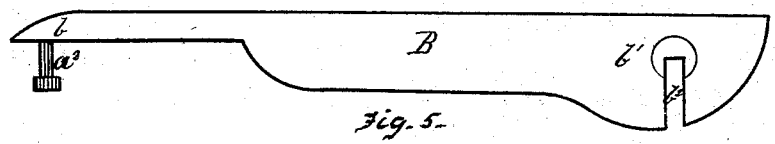

Figure 1 is a perspective view of my improved grate, the upper surface of the bars being in the same horizontal plane. Fig. 2 is a partial perspective view, the agitating-bar being canted, so as to cause the intermediate bars B of the series to move down and back, while bars A move up and forward. Fig. 3 is a section on the line *y y*, Fig. 2. Fig. 4 is a view of the shaking or agitating bar, and Fig. 5 is a view of the grate-bar.

Like letters refer to like parts wherever they occur.

My invention relates to the construction of that class of grates in which a series of movable bars are employed.

I will now proceed to describe my invention, so that others skilled in the art may make and use the same.

In the drawing, A B represent a series of grate-bars, the forward ends of which are rounded or beveled, as at *a b*, so as to turn aside any substance that might otherwise obstruct their movements. The depth of the bars is preferably increased toward the rear ends, as shown at $b^1$, each bar being notched, as at $b^2$, for the reception of the supporting compound crank-bar C, though equivalent means for securing the bar to the transverse crank-bar may be adopted. The forward end of the sliding bars A and B are provided with dovetailed or wedge-shaped projections $a^2$, which move in slots *d* of basket or front piece D, two or more of said projections extending through the slots *d*, and engaging with the shaking or agitating bar E, which is slotted, as at *e*, to permit the play of the pins. D is a basket or front piece, preferably formed of a series of slotted bar-like projections, *d*, which permit the free passage of air and the escape of ashes; but a plate or rest-bar may be employed, if preferred. To this under side of basket D is pivoted the agitating-bar E, having the arms or levers E' slotted, as at *e*, for the reception of pins in the grate-bars. The rear ends of the bars A B are supported upon a transverse rest, which, from its form, I term the "compound crank-bar" C, said bar being journaled in or resting upon abutments, so that when the bar is in the position shown in Fig. 1 the upper surfaces of the grate-bars will all be in the same horizontal plane; but when the cranks are vertical, as shown in Figs. 2 and 3, the intermediate bars B are lower than A, and inclined to the rear, so as to facilitate the discharge of ashes or dust.

The bars H H on the sides of the grate may be dispensed with, and the bearings of the crank-bar made in the brick-work; but where I use the grated front piece D, I prefer to connect these bars thereto, as shown.

The rear ends of the bars A B may be protected by an abutment, built in the brick-work, or by a bridge, I, a similar bridge being employed where front piece D is dispensed with, in which cases the bars A B may have two or more supporting crank-bars, C, instead of one.

The grate is operated as follows: The agitating or shaking bar, being connected to the forward end of one or more of the bars, transmits motion to the compound crank-bar, which is caused to oscillate, carrying the grate-bars past each other with a rising-and-falling motion, which discharges the ashes from the inclined faces of the bars, lifts and agitates the superimposed mass, and displaces by the shear or drawing motion any clinkers that might obstruct the bars.

Having thus described my invention, what I claim, and desire to secure by Letters Patent, is—

1. The combination of a single crank-bar, C, and a series of grate-bars, A B, of unequal width, the ends of the grate-bars opposite the crank or operating bar being supported on a fixed horizontal plane, so as to slide freely thereon, substantially as and for the purpose specified.

2. The combination of a series of grate-bars, A B, compound crank-bar C, and grate-front D, substantially as and for the purpose specified.

3. The combination of a series of grate-bars, A B, one or more of which is connected to the agitating-bar E, the grate-front D, slotted as at d, and the compound crank C, substantially as and for the purpose specified.

4. The combination of a series of grate-bars, A B, operated by one or more compound crank-bars, C, and one or more bridge-bars or abutments, I, substantially as and for the purpose specified.

In testimony whereof I, the said WILLIAM J. SMITH, have hereunto set my hand.

WILLIAM J. SMITH.

Witnesses:
F. W. RITTER, Jr.,
T. B. KERR.